United States Patent [19]

Rudolph

[11] Patent Number: 4,850,835

[45] Date of Patent: Jul. 25, 1989

[54] COOLING DEVICE FOR PLASTIC GRANULATE

[75] Inventor: Joachim Rudolph, Weil der Stadt, Fed. Rep. of Germany

[73] Assignee: Werner & Pfleiderer GmbH, Stuttgart, Fed. Rep. of Germany

[21] Appl. No.: 89,229

[22] Filed: Aug. 25, 1987

[30] Foreign Application Priority Data

Sep. 15, 1986 [DE] Fed. Rep. of Germany ....... 3631376

[51] Int. Cl.[4] ........................ B29D 31/00; B29C 71/00

[52] U.S. Cl. ........................................ 425/67; 264/38; 264/142; 264/180; 264/237; 425/70; 425/86

[58] Field of Search ..................... 264/14, 37, 38, 142, 264/178 F, 178 R, 179, 180, 233, 234, 237; 425/10, 67, 68, 70, 86, DIG. 230

[56] References Cited

U.S. PATENT DOCUMENTS

| | | | |
|---|---|---|---|
| 3,207,818 | 9/1965 | Marshall | 425/67 |
| 3,988,085 | 10/1976 | Krchma | 264/180 |
| 4,032,271 | 6/1977 | Gasior | 264/14 |
| 4,251,195 | 2/1981 | Suzuki et al. | 425/70 |
| 4,294,784 | 10/1981 | Mailund | 264/14 |
| 4,385,016 | 5/1983 | Gwinn | 264/142 |
| 4,606,873 | 8/1986 | Biglione et al. | 264/142 |
| 4,666,607 | 5/1987 | Josefiak et al. | 425/67 |

FOREIGN PATENT DOCUMENTS

| | | | |
|---|---|---|---|
| 1307165 | 9/1962 | France | 264/142 |
| 53-145868 | 12/1978 | Japan | 264/142 |

*Primary Examiner*—Jay H. Woo
*Assistant Examiner*—C. Scott Bushey
*Attorney, Agent, or Firm*—Roberts, Spiecens & Cohen

[57] ABSTRACT

A cooling device for plastic granulate which is formed by cutting plastic strands emerging from a nozzle plate of an extruder and is fed to a stream of cooling water which adjoins the nozzle plate in the region of a cutting device. A pipe conducts the stream of cooling water containing the granulate to a granulate-water separator. In order to obtain a well-defined, infinitely adjustable dwell time of the granulate in the stream of cooling water, the pipe is essentially developed as a vertically arranged riser having a larger cross section passage area than that of the pipe itself. The upper outlet end of the riser is connected to the suction side of a feed pump, which serves as a suction pump, and to a suction pipe which has an end connected to ambient atmosphere. A regulating valve is connected in the suction pipe. The delivery side of the feed pump communicates with the granulate-water separator.

15 Claims, 2 Drawing Sheets

12 11 10 13 9 14 15 16 8 17 26 24 18 7 16 20 2 5 1 4 5' 19 21 3 22 6

COOLING DEVICE FOR PLASTIC GRANULATE

FIELD OF THE INVENTION

The present invention relates to a cooling device for cooling plastic granulate.

More particularly, the present invention relates to the cooling of plastic granulate which has been produced by cutting plastic strands emerging from a nozzle plate of an extruder and conveying the granulate, still in plastic state, in a stream of cooling fluid, via a pipeline, to a separator.

BACKGROUND

Molten plastic compositions prepared in an extruder are discharged in the form of plastic strands from a nozzle plate and are cut into granulate in a stream of a fluid, such as air or water. Due to the cutting energy imparted to the granulate, the granulate becomes heated and it is conveyed by a cooling fluid to a bath of water for separation. The speed of the granulation is controlled by the velocity of flow established for the granulates with the cooling fluid. Floating granulate, i.e. granulate of low density which collects on the surface of the cooling fluid, e.g. water readily causes the formation of lumps hereat, particularly in the case of plastics of high tackiness. With plastic products of high density, accumulations readily occur, and thus the formation of agglomerates within the system conveying the granulates and the cooling fluid.

The dwell time and thus the length of cooling of the individual granulates is dependent therefore not only on the velocity of flow of the conveyance fluid but also on the density of the individual plastic product.

In order to avoid caking of the product and to obtain an optimum granulate temperature, each plastic product furthermore requires a different residence time in the water, which, to be sure, in the case of a pipeline system which is customarily installed in fixed position and with a predetermined amount of water established thereby, can be influenced by its velocity of flow, but cannot be sufficiently determined with reference to the total quantity of granulate since the pressure flow caused by the feeding of water into the conveyance water by means of a feed pump causes turbulence.

From De-OS No. 20 45 801 there is known, for instance, a method and an apparatus for producing dry granulate from plastics in which the granulate is conducted together with the coolant within a pipeline and the extent of the removal of heat can be varied by interrupting the cooling path or optionally changing its length. With the change in the dwell time obtained thereby, the residual heat remaining in the granulate is used, primarily for the drying of the granulate itself and the guidance of the granulate in the coolant is unaffected by this.

SUMMARY OF THE INVENTION

An object of the invention is to provide a cooling device for plastics which tend to stick together in the coolant so that, there can be obtained a well-defined, infinitely adjustable dwell time relative to the total quantity of granulate to be cooled.

This object is achieved by a construction wherein, in a pipe system for conveying plastic granulate in a cooling fluid to a separator, the pipe system comprises a pipe for receiving the plastic granulate and cooling fluid, a vertically disposed riser connected to said pipe and having a greater cross sectional area than that of said pipe, said riser having an upper outlet end, a feed pump having a suction side connected in said pipe system downstream of said outlet end of said riser and a pressure side connected to said separator such that said feed pump acts as a suction pump to convey the cooling fluid and granulate through said riser to said separator, a suction pipe connected to the suction side of said feed pump, said suction pipe having an open end at a pressure greater than the suction pressure at said suction side of the feed pump, and valve means for regulating the connection of said suction side of the feed pump with the open end of the suction pipe thereby to regulate the suction pressure at said suction side.

By constructing the pipe system over substantially its entire length as a vertically arranged riser with a cross sectional passage area which is greater than that of the pipe and by connecting the riser at its outlet end to the feed pump which acts as a suction pump, there is created a cooling zone within which the granulates are guidably conveyed by a suction flow. In contradistinction to a pressure flow, the granulates are, in this case, drawn into the pipe system with the cooling fluid, i.e. water, immediately upon entrance into the stream of cooling water and are not deflected from their direction of flow so that a specific dwell time is obtained and the formation of agglomerates is avoided particularly in the case of plastics which tend to stick together. The pipe itself remains limited to the feed section necessary based on considerations of space between the interface for the granulate and the entrance end region of the riser.

By adjusting the addition of air at the suction side of the feed pump, the velocity of flow of the coolant in the riser can be infinitely adjusted so that the residence time of the granulate in the cooling zone can be varied as a function of the density of the plastic product in freely selectable regions in simple manner. In the case of plastics of high density in which the granulate does not float, it is possible, by suitable throttling of the feed of secondary air, to achieve a high velocity of flow in the cooling zone, in contradistinction to plastics of lower density whose granulates are already accelerated by buoyancy, in which regard, the velocity of flow of the coolant can be throttled by increasing the feeding of secondary air via the suction pipe.

The cooling device can therefore advantageously be employed where frequent changes in product are necessary.

The cross sectional passage area of the riser can be adapted to the requirements of the specific product to be handled if its cross sectional area is between 1.2 and 4.5 times the cross sectional area of the pipe.

In most cases of use, the cross sectional passage area of the riser is sufficient if it is 2.5 times the cross-sectional area of the pipe whereby optimal flow behavior of the granulate is obtained.

According to a feature of the invention, the total length of the cooling path can be increased by providing a plurality of risers in series in a spatially limited region, without replacement of the feed pump, and adapted to the delivery capacity of the pump. In this case the risers remain limited to a maximum possible delivery head.

According to another feature of the invention, a return pipe from the separator is branched into first and second feed lines, the first discharging above a nozzle plate and cutting means and the second supplying return liquid to a receiving container beneath the nozzle plate and cutting means, a valve means being provided in one of the feed lines to control the relative flow through the lines so that the first line delivers up to 20% of the return liquid. By the division of the return liquid in the region of the cutting means, a wetting of the surface of the granulate by a mist of the liquid and an adjustable feed of the liquid for conveyance can be effected. Moreover, the second feed line provides a pressure-less addition of residual liquid into the receiving container which avoids uncontrolled eddying and turbulence, particularly in the region of the entrance of the return liquid.

Compensation for lost liquid by evaporation and the like is advantageously obtained by supplying fresh liquid in controlled amount to the suction side of the suction pump.

In order to effectively control the flow of the return liquid to serve as the coolant liquid for the granulate, the return pipe from the separator contains a pressure pump, a heat exchanger and a storage container connected in series.

BRIEF DESCRIPTION OF THE FIGURES OF THE DRAWING

The invention will be described below with reference to an illustrative embodiment shown in the drawing, in which FIG. 1 diagrammatically illustrates a cooling device for a plastic granulate, according to one embodiment of the invention.

DETAILED DESCRIPTION OF PREFERRED EMBODIMENTS

Figure 1:
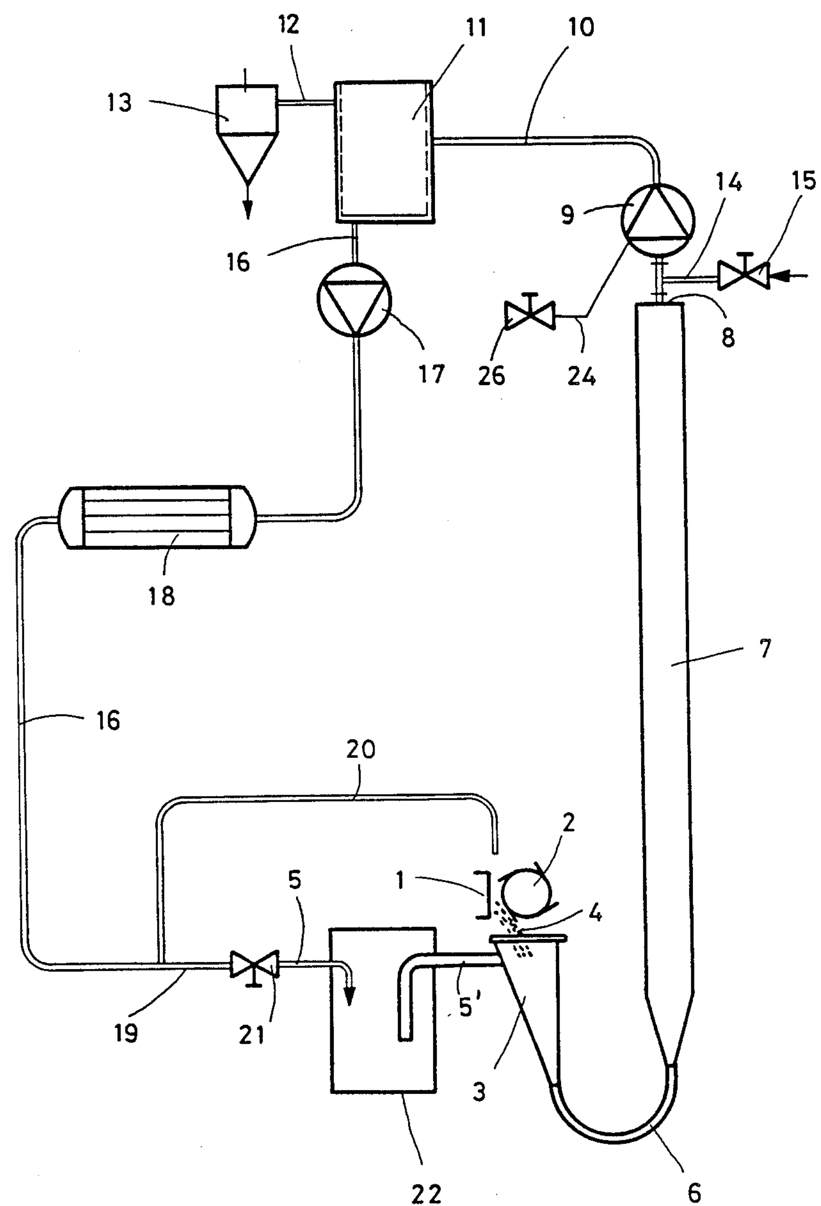

A cooling device according to the invention is diagrammatically illustrated in FIG. 1 in association with an extruder having a nozzle plate 1 from which strands of plastic material are extruded. A rotatable cutting wheel 2 is positioned adjacent to the nozzle plate 1 above a receiving container 3, such that the strands of plastic material extruded from the nozzle plate are cut by the cutting wheel 2 to form granulate 4 which is deposited into an open top of the receiving container 3. In order to transport the granulate 4 for cooling purposes in the cooling device of the invention, a stream of a cooling fluid, for example, a liquid, such as water, is fed into the container by a feed line 5', while a second stream of cooling liquid, to be described in detail later, is discharged onto the granulate 4 between the nozzle plate 1 and the cutting wheel 2.

A pipe 6 is connected to the bottom of the receiving container 3 and conveys the granulate in its conveying stream of cooling liquid through an upright riser 7 having an outlet 8 at its upper end which is connected to the suction side of a feed pump 9 which serves as a suction or vacuum pump.

The pressure side of pump 9 is connected to another pipe 10, in turn, connected to a separator 11 which separates cooling liquid and granulate. The granulate which is separated from the cooling liquid in the separator 11 is conveyed through a feed line 12 into a dryer 13 in which moisture on the surface of the granulate is removed. In order to develop the full suction power of the feed pump 9 upon the starting thereof, the pump 9 is connected to a freshwater feed pipe 24 which can be rapidly closed off by a shut-off valve 26.

In order to regulate the velocity of flow of the cooling water within the riser 7, the outlet end 8 of the riser is also connected to a suction tube 14 whose outlet end is connected to ambient atmosphere. Suction tube 14 permits secondary air to be drawn in adjustable amount into the cooling liquid before entry into feed pump 9 of the cooling liquid charged with granulate.

The regulating of the suction air and thus the purposeful change in the suction capacity of the feed pump 9 is effected by a regulating valve 15 connected in the suction pipe 14 and by which the velocity of conveyance of the cooling liquid and thus the period of cooling of the transported granulate can be continuously adjusted. In this regard, the speed of conveyance in the riser 7 for the specific product can easily be ascertained empirically depending on the nature of the granulate. It has been found that with very sticky granulate such as, for instance, polyurethane, which does not float on the surface in the riser 7, a granulate which is free of agglomerations can be obtained with a relative granulate velocity of about 10 meters per minute. By the "suction" conveyance of the feed pump 9 and the substantially turbulence-free flow in the riser 7 which is thus obtained, the granulates are fed uniformly through the riser 7 so that a well-defined residence time is established.

Any self-priming pump which simultaneously conveys a liquid medium and particles can be used as feed pump 9 which acts as a vacuum pump. One feed pump of this type is, for instance, the vacuum pump supplied by the Helivac Pump company under the name "Helivac".

For feeding of the stream of cooling water into the region of the cutting device 2, a pipe 16 is connected to the separator 11 and the liquid separated by separator 11 is conducted by a pressure feed pump 17 into the region of the cutting device 2. A heat exchanger 18 is connected in pipe 16 for recooling of the cooling liquid.

The total amount of the recycled stream of cooling liquid in pipe 16 is divided in feed lines 19 and 20 to achieve the separate feed of two streams of water into the region of the cutting device 2. A regulating valve 21 is connected in the feed line 19 to regulate the division of the recycled cooling liquid. In this respect, the pressure which is built up in the feed line 20 by the feed pump 17 due to suitable throttling of the regulating valve 21 serves to supply a liquid spray over the cutting device 2. The amount of cooling liquid needed for this purpose is limited at most to 20% of the total amount of the recycled stream of cooling liquid. The remainder of the recycled cooling liquid is introduced into a storage container 22 which is so arranged that its liquid level corresponds responds to the height of the desired liquid level in the collection container 3. The feed of cooling liquid into the collection container 3 thus takes place without pressure, and therefore, the liquid is supplied to container 3 free of eddying and turbulence by the feed line 5'.

Figure 2:
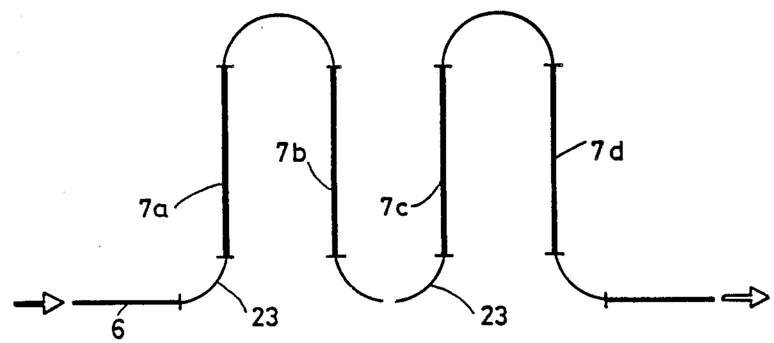
FIGS. 2 and 3 respectively illustrate further embodiments of the cooling device showing different guidance of the product in a plurality of risers.
Figure 3:
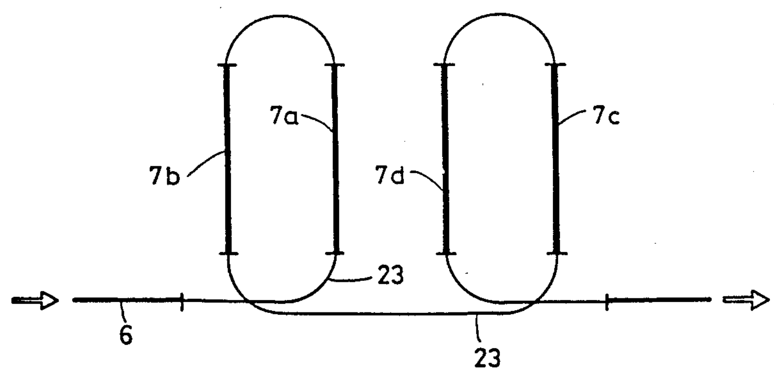

FIGS. 2 and 3 show further embodiments of the cooling device in which the cooling path is formed by a multiple arrangement of vertical risers connected between pipe 6 and suction pump 9. Such an arrangement is advantageous when specific plastics require a particularly long residence time of the granulate in the cooling liquid.

In this case, risers 7*a* and 7*c* are arranged parallel to each other, with inlet and outlet connections located at the same height. The connections can, in each case, be made by flexible connecting lines 23 which connect risers 7*a*, 7*c* to downpipes 7*b*, 7*d* in a series connection with pipe 6. In FIG. 2, the risers 7*a*, 7*c* and the downpipes 7*b*, 7*d* are arranged successively in alternating sequence one after the other whereas in FIG. 3 the downpipes 7*b*, 7*d* are arranged ahead of the risers 7*a*, 7*c*. The arrangement of FIG. 3 extends the overall length of the travel path of the cooling liquid and is particularly useful for granulate which floats in cooling water and requires an extremely long period of cooling, as is the case of polypropylene.

In FIG. 3 the granulate first passes into first riser 7*a* having an inside diameter of, for instance, 100 mm and subsequently into riser 7*c* having an inside diameter of 150 mm, the two risers 7*a* and 7*c* being respectively connected at their outlet and inlet ends with downpipes 7*b* and 7*d*, each of smaller inside diameter. By way of example, the downpipe 7*b* has an inside diameter of 50 mm and the downpipe 7*d* an inside diameter of 75 mm. By this provision, the cross sectional area of the flow passage increases as a whole in the direction of flow so that the velocity of the cooling liquid is reduced while the residence time of the granulate increases accordingly, with increasing cooling and thus reduced tendency of the granulates to stick together. The downpipes 7*b* and 7*d* have comparatively smaller cross sections of passage so that floating granulate is conveyed with a velocity of flow opposite the force of buoyancy which is increased as compared with the risers 7*a* and 7*c*.

In FIG. 2 the risers in FIG. 3 become the downpies and vice versa. The connection of the risers 7*a* and 7*c* one before the other with the downpipes 7*b* and 7*d* as shown in FIG. 2 is suitable for non-floating granulate, such as, for instance, certain groups of polyurethanes. In this case, in contradistinction to the guidance of the product in FIG. 3, the guidance of the product takes place in risers 7*a* and 7*c* having a cross section of flow which is smaller than that of the respective downpipes 7*b* and 7*d*. As a comparison of FIGS. 2 and 3 shows, it is merely necessary to change one to the other by interchanging the bottom connections 23 of the risers and downpipes.

In the arrangement of FIG. 2, the cross section of the flow passage of the risers and downpipes increases, as a whole, in the direction of flow.

The constructions shown in FIGS. 2 and 3 are embodiments in which, in addition to a fine adjustment of the residence time of the granulate in the stream of cooling liquid by the adjustable suction capacity of the feed pump 9, a fundamentally increased residence time of the granulate is provided to obtain cooling for a particular product of determined property.

Although the invention has been described in relation to specific preferred embodiments thereof, it will become apparent to those skilled in the art that numerous modifications and variations can be made within the scope and spirit of the invention as defined in the attached claims.

What is claimed is:

1. A cooling device for cooling plastic granulate which is formed by cutting plastic strands extruded from a nozzle plate of an extruder and is conveyed while still in plastic state in a stream of a cooling fluid through a pipe system to a separator in which the granulate is separated from the cooling fluid, said cooling device comprising said pipe system including a pipe for receiving the plastic granulate and cooling fluid, a vertically disposed riser connected to said pipe and having a greater cross sectional area than that of said pipe, said riser having an upper outlet end, a feed pump having a suction side connected in said pipe system downstream of said upper outlet end of said riser and a pressure side connected to said separator such that said feed pump acts as a suction pump to convey the cooling fluid and granulate through said riser as a suction flow to said separator, a suction pipe connecting the suction side of said feed pump to said upper outlet end of said riser, said suction pipe having an open end at a pressure greater than the suction pressure at said suction side of the feed pump, and valve means for regulating the connection of open end of said suction pipe with the connection between said suction side of the feed pump and the upper outlet end of said riser to regulate the suction pressure at said suction side.

2. A cooling device as claimed in claim 1 wherein said open end of the suction pipe is open to ambient atmosphere.

3. A cooling device as claimed in claim 1 wherein said riser has a constant cross section over its entire length which is between 1.2 and 4.5 times the cross sectional area of said pipe.

4. A cooling device as claimed in claim 3 wherein said riser has a cross sectional area which is 2.5 times greater than that of said pipe.

5. A cooling device as claimed in claim 1 wherein said pipe system includes a further riser connected in series with the first said riser.

6. A cooling device as claimed in claim 5 wherein said further riser is downstream of the first riser and has a greater cross sectional area than that of said first riser.

7. A cooling device as claimed in claim 6 wherein said pipe system further comprises first and second vertically disposed downpipes connected respectively to said risers, the second downpipe being downstream of the first downpipe, said downpipes having different cross sectional areas from one another, said second downpipe having a greater cross sectional area than the first downpipe.

8. A cooling device as claimed in claim 7 wherein the first downpipe is connected to the outlet of the first riser and the second downpipe is connected to the outlet of the further riser.

9. A cooling device as claimed in claim 1 wherein the plastic strands are cut by a cutting device adjacent to the nozzle plate, said pipe system further comprising a return section connected to said separator for returning fluid separated in the separator to the granulate formed at the nozzle plate, said return section including a return pipe connected to said separator for flow of fluid separated in the separator, a pressure pump in said return line, first and second feed lines branched from said return line downstream of the pressure pump, the first feed line having an outlet adjacent to the nozzle plate above the cutting device and a second feed line having an outlet adjacent to the nozzle plate below the cutting device, and means in one of said feed lines for controlling the relative flow through said feed lines so that the amount of cooling fluid conveyed through the first feed line is at most 20% of the returned fluid.

10. A cooling device as claimed in claim 9 wherein the second feed line includes a storage container for the fluid, said means for controlling relative flow of the fluid through the feed lines comprises a throttle valve in said second feed line upstream of said storage container.

11. A cooling device as claimed in claim 10 wherein a collection container is disposed beneath the nozzle plate and the cutting device for receiving the granulate, said collection container having an outlet connected to said pipe, said second feed line including a feed pipe connecting said storage container and said collection container and corresponding to the level of the fluid in the collection container.

12. A cooling device as claimed in claim 1 wherein said feed pump has a further inlet at said suction side and a fresh water feed pipe connected to said further inlet.

13. A cooling device as claimed in claim 12 comprising a control valve on said fresh water feed pipe.

14. A cooling device as claimed in claim 10 comprising a heat exchanger in said return section; said pressure pump, said heat exchanger and said storage container being arranged in that order one after the other in the direction of flow of the return fluid in said return section.

15. A cooling device as claimed in claim 11 wherein said storage container and said collection container are at the same level.

* * * * *